United States Patent
Hayes

[15] 3,697,192
[45] Oct. 10, 1972

[54] HOLLOW TURBINE BLADE
[72] Inventor: Charles W. Hayes, East Hartford, Conn.
[73] Assignee: United Aircraft Corporation, East Hartford, Conn.
[22] Filed: May 7, 1970
[21] Appl. No.: 35,361

[52] U.S. Cl. ..................416/96, 416/97, 416/219, 416/217
[51] Int. Cl. ...........................F01d 5/08, F01d 5/18
[58] Field of Search.......416/92, 96, 97, 90, 217, 219

[56] References Cited

UNITED STATES PATENTS

| | | | |
|---|---|---|---|
| 2,559,131 | 7/1951 | Oestrich et al. | 416/92 |
| 2,780,435 | 2/1957 | Jackson | 416/90 |
| 2,848,192 | 8/1958 | Hayes | 416/90 |
| 2,851,216 | 9/1958 | Scanlan et al. | 416/231 X |
| 3,014,270 | 12/1961 | Eccles | 416/92 X |
| 3,057,597 | 10/1962 | Meyer et al. | 416/92 X |
| 3,446,480 | 5/1969 | Emmerson et al. | 416/90 |
| 3,542,486 | 11/1970 | Kercher | 416/97 X |

FOREIGN PATENTS OR APPLICATIONS

| | | | |
|---|---|---|---|
| 833,770 | 4/1960 | Great Britain | 416/97 |

*Primary Examiner*—Everette A. Powell, Jr.
*Attorney*—Charles A. Warren

[57] ABSTRACT

A hollow cooled gas turbine blade is made by forming an insert with a hollow airfoil and a hollow root portion and with lateral cooling air passages extending through the wall of the airfoil and positioning the insert in a hollow main blade having an airfoil portion and a notch in the root to receive the root portion of the insert with both root portions having aligned serrations on opposite surfaces for supporting the blade and the insert in a turbine disk.

3 Claims, 9 Drawing Figures

PATENTED OCT 10 1972 3,697,192
FIG.1 FIG.2 FIG.3 FIG.5 FIG.7
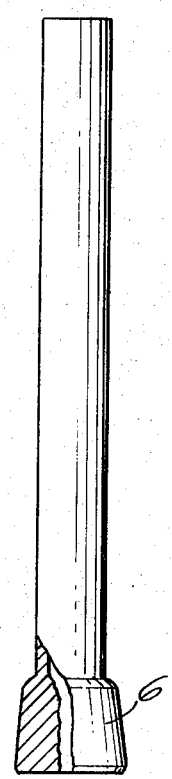
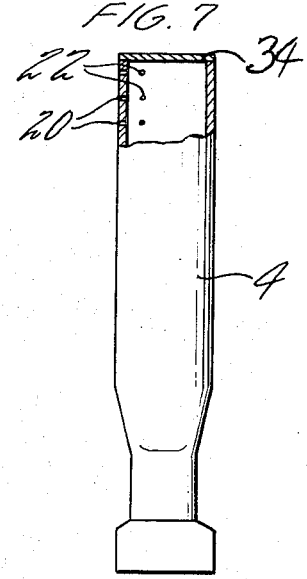
FIG.6
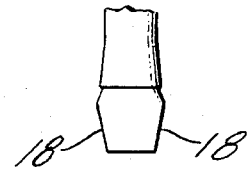
FIG.4
FIG.8
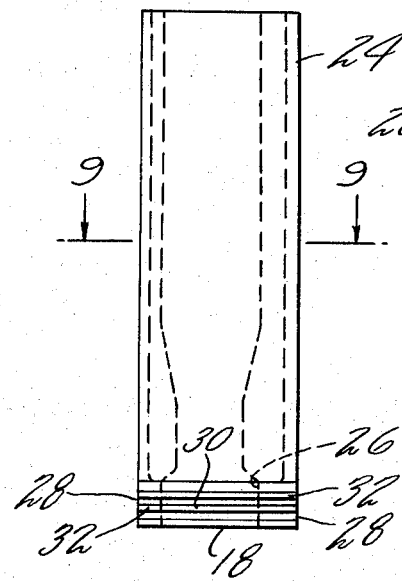
FIG.9
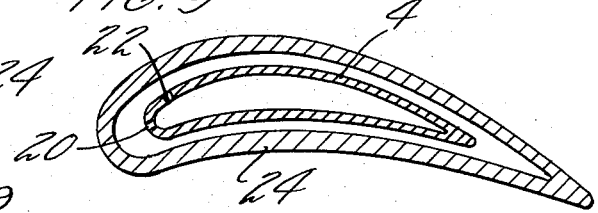
INVENTOR
CHARLES W. HAYES
Charles A. Warren
BY ATTORNEY

HOLLOW TURBINE BLADE

BACKGROUND OF THE INVENTION

For cooling gas turbine blades in high performance engines, it is desirable to direct cooling air onto selected areas of the inner wall surface of a hollow turbine blade, as for example the wall surface adjacent to the leading edge of the blade which is subjected to the most intense heat within the turbine. If an inner sleeve is positioned within the hollow blade for directing the flow of cooling air, the formation of transverse fluid directing holes in the inner sleeve is a serious machining problem. The inner sleeve, functioning primarily as an airflow controlling device, should desirably be as light as possible and still withstand the centrifugal loading on the insert when the blade is in operation as a rotating element in the turbine.

STATEMENT OF THE INVENTION

One feature of the invention is a blade insert that is separately formed and is then positioned within the main blade the insert having a root portion cooperating with the root of the main blade. Another feature is the formation of blade attaching serrations on both root portions so that the insert is supported directly from the disk on which the row of blades is mounted.

According to the invention an insert for turbine blade is formed from a tube one end of which is enlarged to form a root portion after which the root portion is shaped to a substantially rectangular configuration and the remainder of the tube is formed to a hollow air flow configuration with transverse openings located therein for directing the flow of air through said tube in the appropriate direction to engage proper wall surfaces of the surrounding blade. Blade attachment serrations are formed on opposite surfaces of the root portion. The blade insert is assembled by inserting it through a notch formed in the root portion of the main hollow blade and the serrations on the insert will be in alignment with the serrations of the main blade root so that both insert and the main blade are supported from the serrations in the grooves in the periphery of the disk, in which the row of blades is mounted.

BRIEF DESCRIPTION OF THE DRAWINGS

FIG. 1 is a view of a tube before the start of the forming operation.

FIG. 2 is a view of the tube of Fig. 1 with the material at one end of the tube metal-gathered.

Fig. 3 is a view showing the step of finishing the metal gathered portion to the selected dimension internally and externally thereof.

Fig. 4 is an end view showing the forging step.

Fig. 5 shows the steps of thinning the tube and forging the gathered end of the tube so that the metal-gathered portion becomes substantially rectangular.

Fig. 6 is an end view of the root of Fig. 5.

Fig. 7 is a view similar to the preceeding figures showing the remainder of the tube formed into an airfoil shape for insertion within the main turbine blade.

Fig. 8 is a view showing the insert in position within the hollow main blade.

Fig. 9 is a sectional view along the line 9 9 of Fig. 8 showing the insert with a row of holes therein these holes having been provided prior to the assembly of the insert with the main blade.

DESCRIPTION OF THE PREFERRED EMBODIMENT

The manufacture of the insert for the turbine blade is begun with a tube of the appropriate diameter and of the appropriate alloy to withstand the temperatures at which the blade will operate and with the tube longer than the finished blade by a substantial amount as shown in Fig. 1 where the tube is materially longer than the finished insert 4 of Fig. 7.

As the first step in forming the insert, the material of the tube at the bottom end thereof is metal-gathered to form an enlargement 6. This enlarged portion 6 is hollow, since the finished blade insert has a central passage extending through the root portion which is formed from the metal gathered enlargement 6.

The next step after the metal-gathering operation is to machine the outside of the metal-gathered portion 6 to a sleeve shape 8 substantially thicker than the remainder of the tube and the inner and outer surfaces of which are cylindrical, still retaining a passage therethrough longitudinally of the tube. This machining is for the purpose of producing the right volume of material in the sleeve 8 so that subsequent operations can be performed without an excess of material that would prevent the appropriate and accurate forming of the device.

After the sleeve 8 is formed and this is generally done by machining both inside and outside surfaces, the portion of the tube that is later shaped to an airfoil configuration is chemically milled on the outside diameter for reducing the thickness thereof to the minimum thickness that can withstand the loading on the insert when the device is in use. The chemical milling is represented in Fig. 5 where the chemical milling is from the top of the tube down to a shoulder 12 as shown and the thickness of the tube is represented in this figure as being thinner than the thickness in Figs. 2 and 3.

The next step is to hot forge the root portion into a substantially elliptical or oval shape 14, Fig. 4 to make the root more nearly the shape of the finished root configuration. The elliptical or oval shape is represented in Fig. 4 which shows the end of the blade root with the substantially elliptical shape and the central opening therein.

The next step is to machine the root into a rectangular configuration with the end surfaces 16 parallel to one another and the side surfaces 18, Fig. 6 tapering toward each other to conform to the finished shape of the root.

The next step is to form the airfoil portion of the insert to a substantially airfoil configuration as shown in Fig. 9, this forming being accomplished by positioning the tubing between appropriate dies and shaping the tube only in the thinner portions above the shoulder 12 at which point the tubing becomes thicker.

One of the particular problems in making an insert of this type is the formation of holes positioned laterally in the airfoil portion and through which cooling air is directed from within the insert against the inside wall surface of the main blade. Since the insert is a separate element, these holes 20, FIG. 7 may readily be formed in the tubing either before or after the tube is formed into the airfoil configuration. In any event, with the insert outside of and separate from the main blade, it is obvious that these openings 20 may easily be machined at the appropriate location. For example, as shown, the openings 20 are preferably located so they direct cooling air against the inner surface of the main blade at the leading edge thereof. Obviously, other appropriate cooling passages as indicated at 22, FIG. 9 may be provided.

With the insert now in the configuration of FIG. 7, it may be inserted within the main blade 24 as shown in FIG. 8. As best shown in FIG. 8, the airfoil portion of the tube is no longer in chord length than the length of the root portion of the insert or the length of a notch 26 in the main blade root so that the insert may be inserted through the notch 26 as a unit except for the root portion. This notch is provided in the root portion of the main blade and extends transversely therethrough. The insert is inserted upwardly within the main blade into the position shown in FIG. 8 where the root portion 18 of the insert is in lateral alignment with the root portions 28 of the main blade, these portions 28 being located at opposite ends of the root portion 18 of the insert. As shown the root portion 18 of the insert substantially fills the notch 26 in the main blade root.

Either prior to positioning the insert within the main blade, or subsequent thereto, the root portion of the insert has serrations 30 formed thereon in alignment with similar serrations 32 on the root portions 28 of the main blade so that when the assembled blade structure is positioned within a supporting disk the serrations 30 and 32 will all engage with the cooperating serrations in the notches in the disk which serve to support the blades in position.

The assembled structure of FIGS. 8 and 9 has the insert positioned within and spaced from the surrounding blade 24 over the entire airfoil portion thereof and once assembled the cooling passages 20 and 22 will be appropriately located to cool effectively those portions of the main blade that require a cooling action in order to withstand the high temperature of the turbine in which the blades are positioned. Obviously, in order that cooling air may flow out the passages 20 and 22 a suitable cap 34, FIG. 7 is attached to the tip end of the insert at some point in the manufacturing process after the airfoil shape has been produced in the insert.

It will be understood that in making a blade insert as described, since the article started with is a tube, it is readily possible to retain the hollow construction throughout the several steps in the process so that there is always an opening through the root portion of the insert without the need for separately producing this passage at some point in the manufacture of the article. Having established the area of the central passage as a function of the amount of cooling air necessary for flow through the openings 20 and 22, it is possible, in maching the root portion when it is in the form of an enlargement as in FIG. 2, to reduce the inside surface of the machined enlargement 8 to a dimension such that when the blade is finished the cross-sectional area will be adequate to permit the flow of the desired amount of cooling air into the blade portion of the insert.

I claim:

1. A gas turbine blade construction including
   a main blade having a main root portion with blade attachment means on opposite sides thereof and with a transverse groove extending entirely across the root portion and an integral airfoil portion projecting from said root portion, and
   an insert within said main blade, said insert including an insert airfoil portion within and spaced laterally from said main blade airfoil portion and an insert root portion to which said airfoil portion is attached, said insert root portion extending transversely across said main root portion and fitting in the transverse groove therein, said insert having blade attachments means thereon in alignment with those on the main root, said insert root portion supporting the insert airfoil portion within and in spaced relation to the blade airfoil portion.

2. A blade construction as in claim 1 in which the insert has a passage extending longitudinally thereof, including the insert root portion, and lateral passages positioned transversely in said insert air foil portion and communicating with the longitudinal passage.

3. A blade construction as in claim 2 in which the airfoil portion of the insert is hollow and the passage in the insert root portion of the insert communicates from said hollow airfoil portion to the base of the root.

* * * * *